United States Patent [19]

Ando et al.

[11] Patent Number: 4,749,432

[45] Date of Patent: Jun. 7, 1988

[54] METHOD OF FABRICATING ADHESIVE SHEET HAVING NON-ADHESIVE AREAS

[75] Inventors: Masatoshi Ando; Hiroyuki Yoshino; Hisayoshi Nito; Shuichiro Takeda, all of Amagasaki, Japan

[73] Assignee: Kanzaki Paper Mfg. Co., Ltd., Amagasaki, Japan

[21] Appl. No.: 5,420

[22] Filed: Jan. 20, 1987

[30] Foreign Application Priority Data

Jan. 22, 1986 [JP] Japan .................................. 61-12642

[51] Int. Cl.$^4$ ........................ B32B 31/12; B32B 31/18
[52] U.S. Cl. ................................. 156/257; 156/268; 156/289; 156/291; 156/498; 427/208.6; 427/277; 427/358
[58] Field of Search ............... 156/153, 257, 268, 291, 156/344, 249, 295, 289, 498; 427/208.6, 271, 277, 356, 358

[56] References Cited

U.S. PATENT DOCUMENTS

| | | | |
|---|---|---|---|
| 2,261,983 | 11/1941 | Ford | 156/295 X |
| 2,861,009 | 11/1958 | Rubner | 427/271 X |
| 3,544,409 | 12/1970 | Komp | 156/249 X |
| 4,423,103 | 12/1983 | Bogdany | 427/271 X |

FOREIGN PATENT DOCUMENTS 1349173  3/1974  United Kingdom .

Primary Examiner—Robert A. Dawson

[57] ABSTRACT

A non-adhesive coated area substantially accurately coinciding with the width of a blade is formed on an adhesive sheet fabricated by forming the adhesive layer by coating an adhesive on the entire one side surface of a release sheet, scraping the adhesive layer by a blade having a suitable width to form a non-coated area in the adhesive layer, and then bonding a surface sheet to the adhesive layer having the non-coated area.

8 Claims, 5 Drawing Sheets

METHOD OF FABRICATING ADHESIVE SHEET HAVING NON-ADHESIVE AREAS

BACKGROUND OF THE INVENTION

The present invention relates to a method of fabricating an adhesive sheet formed of a surface sheet, an adhesive layer coated on the back side of the surface sheet and a release sheet for protecting the adhesive layer. More particularly, the invention relates to a method of fabricating an adhesive sheet having one or more slender non-adhesive coated areas, along the longitudinal direction of the sheet, in an adhesive layer interposed between a surface sheet and a release sheet.

An adhesive sheet has an adhesive or a pressure-sensitive adhesive coating layer on a surface sheet such as paper, cloth or film, and the adhesive sheet further has a release sheet made of paper, cloth or film as a base material ordinarily bonded to the adhesive coating layer so as to prevent the adhesive sheet from sealing or adhering to each other. The release sheet prevents the adhesive coating layer from being exposed. Such an adhesive sheet is generally fabricated by a method comprising of coating an adhesive on one side surface of a release sheet having a wide width continuously fed from a roll, then drying the adhesive coating layer to form an adhesive layer on the release sheet, and then bonding a surface sheet of wide width continuously fed from a roll to the adhesive layer. The adhesive sheet can be also fabricated by a method comprising of coating an adhesive on a surface sheet to form the adhesive layer instead of coating an adhesive on the release sheet, and then bonding the release sheet to the adhesive layer.

Irrespective of coating the adhesive on the release sheet or the surface sheet, it is customary to wind the adhesive sheet of wide width thus fabricated on a roll, and to cut the adhesive sheet in a suitable width or to feed the adhesive sheet out and to wind the sheet on other rolls while longitudinally cutting the sheet in a suitable width and then to supply the cut sheet to the step of forming the sheet in labels, stickers or tags. Thus, it is preferable at a point of view of non-contaminating cutting blades and rolls of a cutting machine with the adhesive that the adhesive layer of the adhesive sheet to be cut is of non-adhesive coated areas. In this case, since portions that do not adhere of the adhesive sheet after cutting remain widely if the width of the non-adhesive coated areas is excessively wide, it is necessary to accurately form the non-adhesive coated areas in an intended narrow width. Further, the adhesive sheet formed in labels, stickers or tags is bonded to the surface of an article for end use purpose after separating the release sheet from the adhesive layer. Therefore, it is convenient to form a non-adhesive coated area on the adhesive sheet so as to separate the release sheet from the adhesive sheet by readily grasping the release sheet by fingers or other means. Moreover, it is also preferable at a point of view of non-contaminating cutters and rolls in an apparatus that makes marginal holes that the marginal hole portions are of non-adhesive coated areas even when the marginal holes are formed at one or both sides of the adhesive sheet. However, if an adhesive is coated and dried on the entire surface of the surface sheet or the release sheet in case of fabricating the adhesive sheet, the adhesive sheet having the non-adhesive coated area cannot be provided.

The following methods exist as a method of fabricating a sheet having a non-coated area. One is, as disclosed in GB1349173 (Japanese Patent Application Laid-open No. 25503/1973), a method of fabricating a sheet by coating a coating liquid on a sheet by an applicator roll, and scraping the coating liquid on the roll circumferentially by a doctor blade before the roll makes contact with the sheet. The other is, as disclosed in Japanese Patent Application Laid-open No. 69238/1978, a method of fabricating a sheet by using a coating device in which a partition plate extending upwardly from a bath level of a coating liquid bath is installed vertically with respect to the rotational shaft of an applicator roll in contact with the surface of the roll in the bath in which the lower part of the roll is dipped. According to this method, the partition plate can prevent the coating liquid from being applied to the roll, and a non-coated area slender in a circumferential direction can be formed in the coating layer on the surface of the applicator roll.

However, the application of the above-described methods to fabricate the adhesive sheet does not meet with good results since the adhesive has relatively high viscosity such as 2000 to 9000 cps and frequently 2000 to 6000 cps at 20° C. Since pressing pressure is applied to the adhesive layer in case of pressing a surface sheet or a release sheet to the adhesive layer having a non-adhesive coated area formed on the surface of the applicator roll to transfer the adhesive layer to the sheet, the adhesive layer is extended laterally to the non-coated area. Thus, the width of the non-adhesive coated area transferred to the sheet is narrowed irregularly as compared with the width on the applicator roll. In other words, it is substantially impossible to transfer the adhesive layer having the same width of the non-adhesive coated area as that of the non-adhesive coated area on the applicator roll to the sheet by pressing the adhesive layer prepared on the roll with the non-adhesive coated area of the intended width on the surface sheet or the release sheet. Since it is not rare to form the width of the non-adhesive coated area in milli-meter order in case of forming the non-adhesive coated area on the adhesive sheet, the above-described fact is very inconvenient to fabricate the adhesive sheet.

SUMMARY OF THE INVENTION

The present invention provides a method of fabricating an adhesive sheet having a surface sheet, an adhesive layer coated on the back side of the surface sheet, and a release, sheet for protecting the adhesive layer, and one or more slender non-adhesive coated areas along the longitudinal direction of the sheet in the adhesive layer interposed between the surface sheet and the release sheet. A method of fabricating an adhesive sheet according to the present invention comprises coating an adhesive or a pressure-sensitive adhesive on one side of a release sheet or a surface sheet by an applicator roll to form an adhesive layer thereon, then scraping the adhesive layer on the sheet by blades each having a suitable width longitudinally of the sheet to form a non-adhesive coated area on the sheet, and then bonding the surface sheet or the release sheet on the adhesive layer having the non-adhesive coated area. An angle of the blade for scraping the adhesive layer and the sheet having the adhesive layer . . . called "a blade holding angle" in the specification to be defined later . . . is preferably regulated to be 90° or larger. The blade is preferably held by a blade holder having cooling means.

DETAILED DESCRIPTION OF THE PREFERRED EMBODIMENTS

Figure 1:
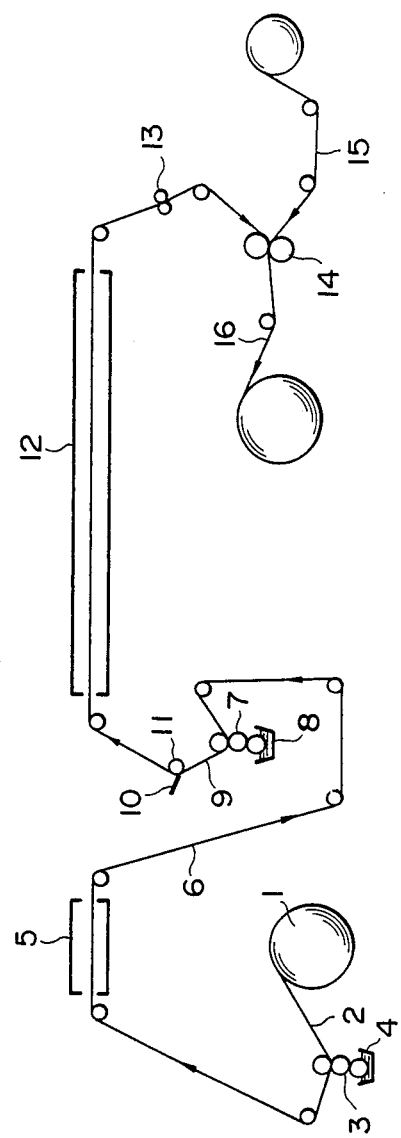
FIG. 1 is a schematic view illustrating the fabricating steps of an adhesive sheet according to the present invention.

A method of fabricating an adhesive sheet according to the present invention will be described in more detail with reference to the accompanying drawings. In FIG. 1, A release sheet base material 2 fed from a roll 1 passes a release agent coating device 3 composed of a pickup roll partly dipped in a release agent bath 4, an applicator roll and a backing roll, and is coated with a release agent on one side surface thereof through the coating device 3. Then, the release sheet is fed to a drier 5, and dried by the drier 5 to form a release agent layer on the sheet. The release sheet 6 having the release agent layer is then supplied to an adhesive coating device 7 composed of a pickup roll partly dipped in an adhesive bath 8, an applicator roll and a backing roll, and coated with an adhesive on the surface of the release agent layer of the sheet 6 in the coating device 7 to form a release sheet 9 having the adhesive layer. Then, the release sheet 9 is fed between blades 10 and a backing roll 11, only the adhesive layer of the release sheet 9 is scraped longitudinally by blades 10 having a predetermined width to form non-adhesive coated areas in the adhesive layer. The release sheet 9 is then fed to a drier 12, and the adhesive layer of the release sheet 9 is dried by the drier 12. The release sheet having an adhesive layer formed with slender non-adhesive coated areas is then fed to a slitter 13, slits are formed on the release sheet formed with the non-adhesive coated areas, and the release sheet is then supplied to a laminator 14. A surface sheet 15 fed from the roll is supplied to the laminator 14, which bonds the surface sheet on the adhesive layer of the release sheet to provide an adhesive sheet 16. The adhesive sheet is ordinarily wound on a roll.

In the embodiment shown in FIG. 1, the adhesive is coated on the release sheet 6. However, an adhesive sheet can be also provided by coating the adhesive on the surface sheet instead of the release sheet; forming an adhesive layer having slender non-adhesive coated areas by scraping the adhesive by blades each having a predetermined width on the surface sheet similarly to the above case; and bonding the release sheet on the adhesive layer. It is general to employ a metering roll for regulating the thickness of the coating layer, though not shown, in the release agent coating device and the adhesive coating device described above.

In the method of fabricating an adhesive sheet according to the present invention, the surface sheet, the release sheet base material, the release agent and the adhesive, i.e., the pressure-sensitive adhesive used in the method are not limited particularly; and any of sheet materials, release agents and pressure-sensitive adhesives known by those skilled in the art can be used as the surface sheet, the release sheet base material, the release agent and the adhesive of the adhesive sheet. More specifically, paper, cloth and plastic film can be used as the surface sheet and the release sheet base material. Silicone, low molecular weight polyethylene, paraffin may be used as the release agents. If the sheet material used for the release sheet base material has a self-releasable property, it is not necessary to use a release agent. The adhesive can employ, for example, acrylic type adhesives, methacrylic type adhesives, vinyl acetate type adhesives, or rubber type adhesives in which suitable tackifiers are mixed with natural rubber or styrene-butadiene copolymer in the form of aqueous emulsion or solvent solution.

Figure 2A:
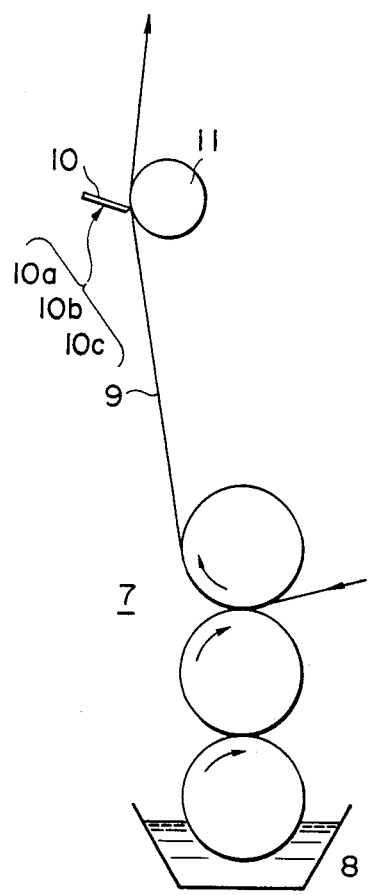
FIG. 2a is a detailed view as seen from the lateral direction of the sheet for the states that an adhesive is coated on the sheet according to the method of the present invention and the adhesive layer on the sheet is scraped by blades.
Figure 2B:
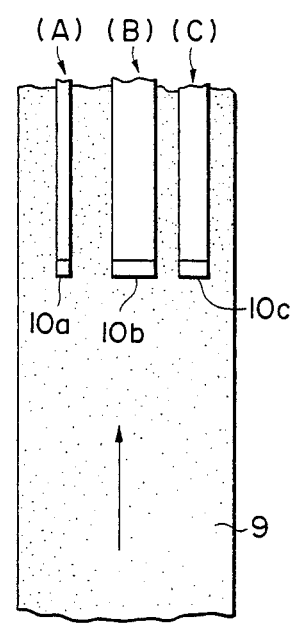
FIG. 2b is a detailed view as similarly seen from the front direction of the sheet.

The most advantageous feature of the present invention resides in the adhesive layer having one or more non-adhesive coated areas extending longitudinally of an adhesive sheet provided by scraping parts of the adhesive layer coated on the entire one side surface of the sheet by one or more blades each having a predetermined width, and the details are shown in FIGS. 2a, 2b. More particularly, in FIGS. 2a and 2b, when the ends of three blades 10a, 10b and 10c are intruded upon the adhesive layer on the release sheet 9 while supporting the back surface of the release sheet 9 by the backing roll 11, non-adhesive coated areas (A), (B) and (C) can be formed longitudinally of the sheet as shown in FIG. 2b in the adhesive layer on the release sheet 9 since the release sheet 9 moves in the direction of arrows in FIG. 2b.

Figure 3A:
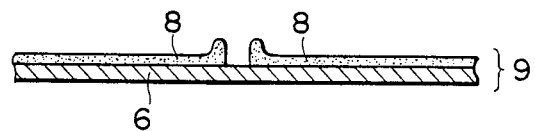
FIG. 3a is a cross sectional view of a release sheet having adhesive layer with a non-adhesive area formed in case that a blade holding angle is less than 90°.
Figure 3B:
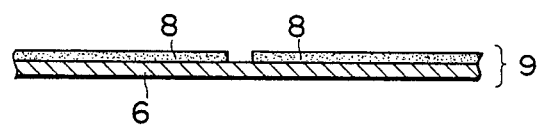
FIG. 3b is a cross sectional view of a release sheet formed with a non-adhesive coated area formed in case that a blade holding angle is 90° or larger.

When the adhesive scraped by the blades stays near the contacted portions of the sheet with the blades, the adhesive is moved laterally of the blades to form raised adhesive at the edges of the adhesive layer adjacent to the non-adhesive coated areas (which are the areas that the adhesives are scraped by the blades) as shown in FIG. 3a. The raised parts of adhesive are collapsed by the pressure produced by bonding with the surface sheet (or the release sheet) to be extended to the non-adhesive coated area. Thus, the non-adhesive coated area having the intended width is difficult to be formed on the sheet. In order to prevent the scraped adhesives by the blades from staying near the blades, an angle formed between the blade and the adhesive layer on the sheet, i.e., "the blade holding angle" is very important. According to the present invention, the blade holding angle is preferably regulated to be 90° or larger, and more preferably 140±20°. When the "blade holding angle" is held at 90° or larger, the scraped adhesive flows longitudinally along the blades by the inertia of the adhesive moving with the sheet. Thus, the adhesive does not stay near the contacts of the blades with the sheet. As a result, as shown in FIG. 3b, the raised parts of adhesive are not formed, and a non-adhesive coated part of the intended width is, accordingly, formed after laminated. The reason why the upper limit of the blade holding angle is set to 160° is because the blade holder is prevented from being contacted with the sheet. Here, "the blade holding angle" is defined as below.

Figure 4:
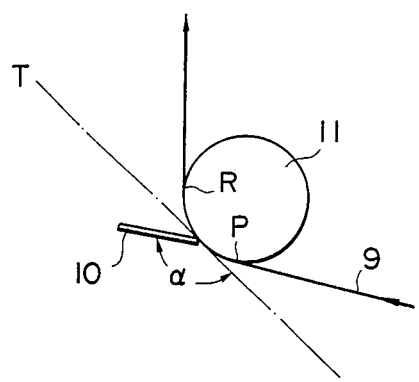
FIG. 4 is an explanatory view of the positional relationship between the blade for scraping the adhesive layer and the sheet.

As shown in FIGS. 2a and 4, when scraping the adhesive layer on the sheet supported by the backing roll 11, and angle $\alpha$ formed between the blade and the tangential line T at a point of contacting the blade with a circular arc PR formed of the sheet is a blade holding angle (FIG. 4), where P represents a point of starting contacting the sheet with the roll 11, and R represents a point of separating the sheet from the roll 11. When scraping the adhesive layer on the sheet not contacted with the backing roll 11, an angle formed between the blade and the sheet, before scraping the adhesive layer is a blade holding angle. In any case, the blades used in the method of the present invention preferably have rigidity so as not to deflect during the operation. The blades are generally formed of a steel plate.

As shown in FIG. 4, the embodiment of scraping the portion supported by the backing roll 11 of the adhesive layer on the sheet can reliably remove the adhesive to effectively enhance the accuracy of the removing width of the adhesive layer.

Figure 5:
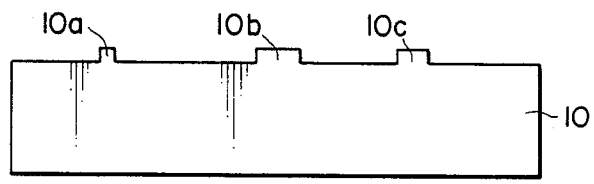
FIG. 5 is a plan view illustrating an example of the blade used in the present invention with a single blade having a plurality of rectangular projections.
Figure 6:
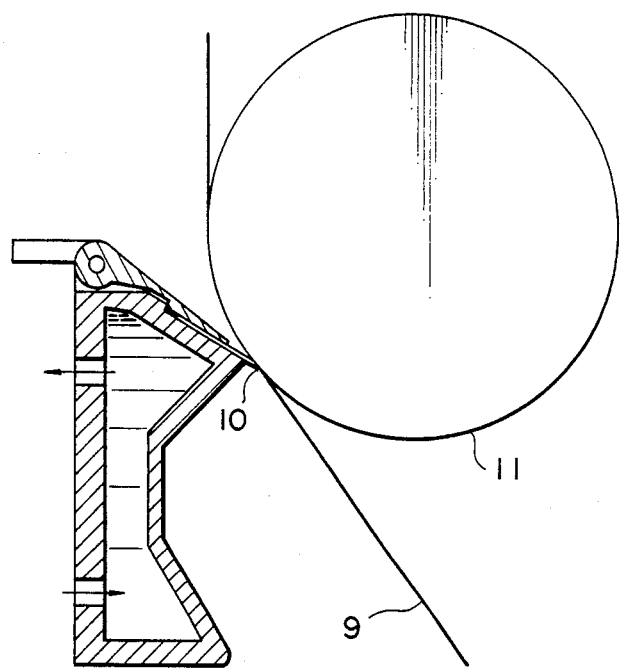
FIG. 6 is a sectional view of an example of a blade holder having cooling means used in the present invention.

In the invention, when a plurality of non-adhesive coated areas are formed in the adhesive layer on the sheet, the blades used may be combined with a plurality of blades of predetermined size in parallel, or formed of a single blade 10 having rectangular projections 10a, 10b and 10c as shown in FIG. 5. It is noted that the former is preferable at a point of view of remedying the alteration in the removing width. In the case that the method of the invention employs one or a plurality of blades, each blade is preferably supported by a suitable holder at the blade holding angle defined previously with respect to the sheet having the adhesive layer. In the present invention, the ends of the blades are preferably projected substantially at about 2 to 3 mm from the blade holder to prevent the blades from deflecting. As shown in FIG. 6, the blade holder is preferaly constructed to pass cooling medium, and when the medium such as water of 5° C. or lower is fed through the holder, it can effect to suppress the evaporation of the solvent or dispersion medium of adhesive, and particularly when an aqueous emulsion type adhesive is used, an ambient moisture is condensed on the surface when the blade holder and the blades are cooled, and the condensed water preferably prevents the adhesive scraped by the blades from solidifying due to drying on the blades and the holder.

Figure 7:
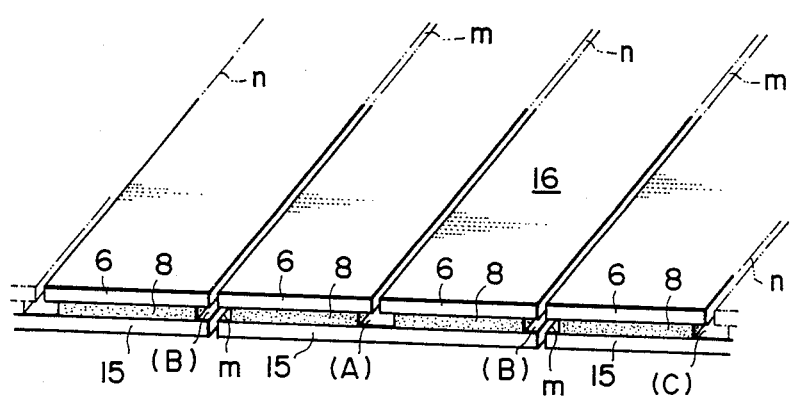
FIG. 7 is a perspective view of the adhesive sheet fabricated by the method of the present invention.
Figure 8A:
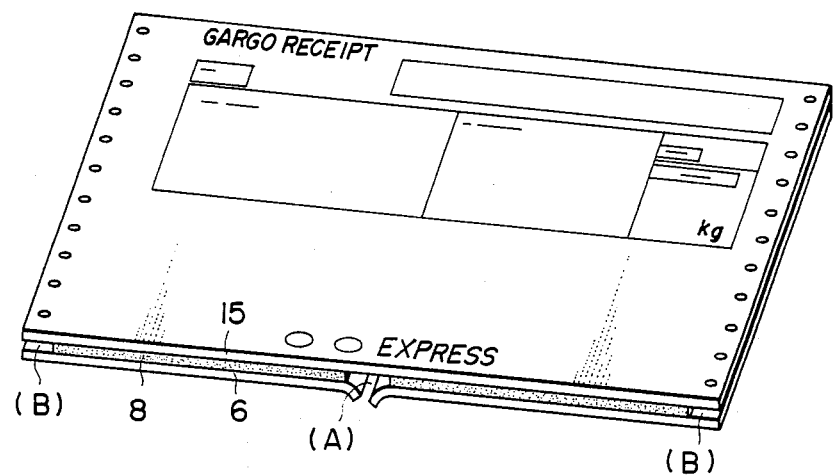
FIG. 8a is a perspective view as seen from the front surface for a delivery tag fabricated from the adhesive sheet of the present invention.
Figure 8B:
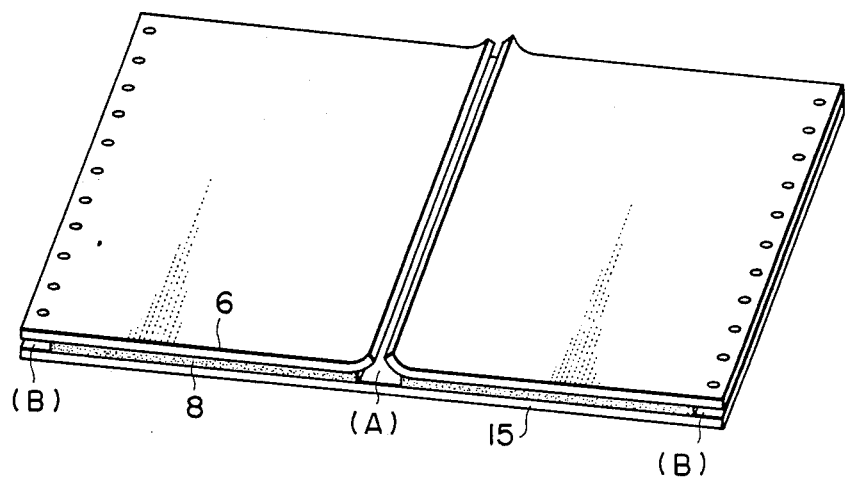
FIG. 8b is a perspective view as seen from the back surface for the tag.

Returning to FIG. 1, the release sheet 9 having the adhesive layer formed with the non-adhesive coated areas by the blades 10 passes the drier 12 so that the adhesive layer is dried, then formed with slits by the slitter 13, bonded with the surface sheet 15 with the adhesive layer by the laminator 14 to be finished as the adhesive sheet 16. FIG. 7 illustrates a perspective view of the adhesive sheet thus fabricated. Numeral 6 designates a release sheet coated with a release agent, numeral 8 designates an adhesive layer, and numeral 15 designates a surface sheet. Reference characters (A), (B) and (C) designate non-adhesive coated areas, character m designates slits formed on the release sheet and the surface sheet, and character n designates back splits formed on the release sheet. When the adhesive sheet fabricated by the method according to the present invention is separated at the slits m and desired print is executed on the sheet 15, the non-adhesive coated area (B) becomes the part having marginal holes as shown in FIGS. 8a and 8b, and a delivery tag which contributes to separation of the release sheet 6 from the adhesive layer by the non-adhesive coated area (A) can be provided.

According to the method of fabricating the adhesive sheet in accordance with the present invention difference from the prior art, parts of the adhesive layer are scraped longitudinally from the sheet by the blades each having a predetermined width after forming the adhesive layer on the entire surface of the sheet to form the non-adhesive coated areas in the adhesive layer. Therefore, the width of the non-adhesive coated areas are non narrowed irregularly as compared with the intended width like the adhesive sheet manufactured by the prior art. According to the present invention, the adhesive sheet formed accurately with the adhesive removing width in the portion where the adhesive is not necessary can be fabricated to form the non-adhesive coated area of several mm in width.

EXAMPLE 1

Coating composition which contained as main ingredient an aqueous emulsion type acrylic adhesive was coated at a dry coating weight of 20 g/m$^2$ by a roll coater on the release agent coated surface of a release sheet formed by coating release agent on glassine paper to form an adhesive layer. Blades of 5, 10 and 15 mm of widths mounted in a holder having cooling means were installed at 115° of blade holding angle in the state the blades pressed on the portion of the release sheet which is supported by a backing roll, and intruded at the ends thereof upon the undried adhesive layer to form non-adhesive coated areas in the adhesive layer on the release sheet by moving forward the release sheet. Water of 4° C. was circulated in the cooling means of the holder. The release sheet formed with the non-adhesive coated areas was supplied to a drier to dry the adhesive layer, the surface sheet was then bonded thereto to finish the adhesive sheet. When the widths of the non-adhesive coated areas of the resulting adhesive sheet were measured, the measured values were 4.9, 9.9 and 14.9 mm, respectively to be extremely approximated to the blade widths. The fixture of the adhesive was not recognized on the blades and the blade holder.

EXAMPLE 2

An adhesive sheet was fabricated by the same method as that in the EXAMPLE 1 except that the blade holding angle was set to 80°, in this example 2. In the process before laminating the surface sheet, it was found that the thicknesses of the adhesive layer adjacent to the non-adhesive coated areas formed by the blades increased at some positions. There were some non-adhesive coated areas of the adhesive sheet obtained by laminating with the surface sheet in partial reduction in the width. However, the widths of the most remaining non-adhesive coated areas were 4.9, 9.9 and 14.9 mm, respectively.

EXAMPLE 3

In this example 3, an adhesive sheet was fabricated by the same method as that in the EXAMPLE 1 except that cooling water was not circulated in the cooling means of the blade holder. The widths of the non-adhesive coated areas of the adhesive sheet thus provided were 4.9, 9.9 and 14.9 mm, but slight fixture of the adhesive coating composition occurred on the blades and the blade holder.

COMPARATIVE EXAMPLE 1

In this comparative EXAMPLE 1, the adhesive sheet was manufactured by prior art.

Coating composition which contained as main ingredient an aqueous emulsion type acrylic adhesive used in example 1 was coated on a release sheet at a dry coating weight of 20 g/m² to form an adhesive layer. Blades of 5, 10 and 15 mm of widths mounted in a holder were pressed at the ends thereof on the surface of the applicator roll of the coater to scrape parts of the adhesive layer to form non-adhesive coated areas in the adhesive layer on the applicator roll. Then, the release agent coated surface of the release sheet coated with release agent on glassine paper used in the EXAMPLE 1 was contacted with the applicator roll to transfer the adhesive layer on the roll to the release sheet, dried, then bonded with a surface sheet to finish the adhesive sheet. When the widths of the non-adhesive coated areas of the obtained adhesive sheet were measured, the average measured values were 3, 8 and 13 mm, and much deteriorated in the uniformity of the widths as compared with that of the EXAMPLES 1 to 3.

We claim:

1. A method of fabricating an adhesive sheet comprising:
    coating an adhesive on one side of a release sheet or a surface sheet which is selected from the group consisting of paper, cloth and plastic film to form an adhesive layer thereon,
    then scraping said adhesive layer on said sheet, while said sheet is supported by a backing roll, by means of a blade having a suitable width and which is mounted in a holder, longitudinally of said sheet to form a non-adhesive-coated area on said sheet,
    said blade being mounted at a blade holding angle of at least 90°, and
    then bonding a surface sheet or a release sheet on said adhesive layer having said non-adhesive-coated area on said sheet.

2. The method as claimed in claim 1, wherein said holder has cooling means.

3. The method as claimed in claim 1, wherein the adhesive is selected from a group consisting of a vinyl acetate type, acrylic type, methacrylic type, and rubber type adhesives.

4. The method as claimed in claim 1, wherein the viscosity of the adhesive is 2000 to 9000 cps. at 20° C.

5. A method of fabricating an adhesive sheet comprising:
    coating an adhesive on one side of a release sheet or of a surface sheet which is selected from the group consisting of paper, cloth and plastic film to form an adhesive layer thereon,
    then scraping said adhesive layer on said sheet, while said sheet is supported by a backing roll, by means of a blade having a suitable width and which is mounted in a holder, to thereby form a non-adhesive-coated longitudinal area on said sheet,
    said blade being mounted at a blade holding angle of 140±20°, and
    then bonding a surface sheet or a release sheet to said adhesive layer having said non-adhesive-coated area on said sheet.

6. The method as claimed in claim 5, wherein said holder has cooling means.

7. The method as claimed in claim 5, wherein said adhesive is selected from the group consisting of a vinyl acetate type, acrylic type, methacrylic type, and rubber type adhesives.

8. The method as claimed in claim 5, wherein the viscosity of said adhesive is 2000 to 9000 cps. at 20° C.

* * * * *